(12) United States Patent
Johnson (10) Patent No.: US 12,130,922 B1
(45) Date of Patent: Oct. 29, 2024

(54) SCANNING OF FILES IN A CUSTOMER ACCOUNT OF A CLOUD SERVICE FOR CYBERSECURITY

(71) Applicant: Trend Micro Incorporated, Tokyo (JP)

(72) Inventor: Brendan M. Johnson, Coppell, TX (US)

(73) Assignee: TREND MICRO INCORPORATED, Tokyo (JP)

( * ) Notice: Subject to any disclaimer, the term of this patent is extended or adjusted under 35 U.S.C. 154(b) by 206 days.

(21) Appl. No.: 17/967,647

(22) Filed: Oct. 17, 2022

(51) Int. Cl.
*G06F 21/55* (2013.01)
*G06F 21/56* (2013.01)

(52) U.S. Cl.
CPC .......... *G06F 21/568* (2013.01); *G06F 21/552* (2013.01); *G06F 21/565* (2013.01)

(58) Field of Classification Search
CPC ..... G06F 21/568; G06F 21/552; G06F 21/565
See application file for complete search history.

(56) References Cited

U.S. PATENT DOCUMENTS

| | | | |
|---|---|---|---|
| 10,721,311 | B1 | 7/2020 | McDonald |
| 10,740,149 | B2 | 8/2020 | Bogineni et al. |
| 10,853,183 | B2 | 12/2020 | Natanzon et al. |
| 10,884,807 | B2 | 1/2021 | Shimamura et al. |
| 10,915,382 | B2 | 2/2021 | Zhang et al. |
| 10,938,677 | B2 | 3/2021 | Shimamura et al. |
| 11,704,408 | B1 * | 7/2023 | Ciubotariu ............ G06F 21/565 726/23 |
| 2019/0332366 | A1 * | 10/2019 | Natanzon ............ G06F 11/3696 |
| 2021/0117549 | A1 | 4/2021 | Mandagere et al. |
| 2022/0164120 | A1 | 5/2022 | Kannan et al. |
| 2023/0008968 | A1 * | 1/2023 | Pabon et al. .......... G06F 3/0659 |

OTHER PUBLICATIONS

Leveraging the Serverless Architecture for Securing Linux Containers, by Bila et al., published 2017. (Year: 2017).*
Kisller, Edward, "A Beginner's Guide to Understanding and Building Docket Images", https://jfrog.com/knowledge-base/a-beginners-guide-to-understanding-and-building-docker-images/, JFrog Ltd, 2022.

(Continued)

*Primary Examiner* — Vu V Tran
(74) *Attorney, Agent, or Firm* — Beyer Law Group LLP (57) ABSTRACT

A cloud computing infrastructure hosts a web service with customer accounts. In a customer account, files of the customer account are listed in an index. Files indicated in the index are arranged in groups, with files in each group being scanned using scanning serverless functions in the customer account. The files in the customer account include a compressed tar archive of a software container. Member files of a compressed tar archive in a customer account are randomly-accessed by way of locators that indicate a tar offset, a logical offset, and a decompressor state for a corresponding member file. A member file is accessed by seeking to the tar offset in the compressed tar archive, restoring a decompressor to the decompressor state, decompressing the compressed tar archive using the decompressor, and moving to the logical offset in the decompressed data in memory.

6 Claims, 8 Drawing Sheets

(56) References Cited

OTHER PUBLICATIONS

"Amazon EBS Volumes", https://docs.aws.amazon.com/AWSEC2/latest/UserGuide/ebs-volumes.html, Amazon Web Services, Inc., 2022.
"What are Serverless Functions?" https://www.splunk.com/en_us/data-insider/what-are-serverless-functions.html, Splunk, Sep. 1, 2019.
"What is Amazon EC2", https://docs.aws.amazon.com/AWSEC2/latest/UserGuide/concepts.html, Amazon Web Services, Inc., 2022.
Containerization, IBM Cloud Education, https://www.ibm.com/topics/containerization, Jun. 23, 2021.
Gzip, https://en.wikipedia.org/wiki/Gzip, last edited Sep. 11, 2022.
Serverless Computing, https://en.wikipedia.org/wiki/Serverless_computing, last edited Aug. 29, 2022.
Tar (computing), https://en.wikipedia.org/wiki/Tar (computing), last edited Sep. 1, 2022.
Use container to Build, Share and Run our application—Containerized Applications, https://www.docker.com/resources/what-container/, 2022.

\* cited by examiner

SCANNING OF FILES IN A CUSTOMER ACCOUNT OF A CLOUD SERVICE FOR CYBERSECURITY

TECHNICAL FIELD

The present disclosure is directed to file processing and cloud service cybersecurity.

BACKGROUND

Third-party cloud services, such as the Amazon Web Services (AWS)™ cloud service, provide computing resources, such as storage and compute resources, to customers so that the customers can run application programs without having to purchase and maintain their own infrastructure. These cloud services are third-party relative to their customers in that they are not associated with the customers. A cloud service may charge customers based on central processing unit (CPU), memory, data storage, and/or network bandwidth consumption.

Third-party cybersecurity services are available to customers of cloud services. These cybersecurity services are third party relative to the customers and the cloud service. Providing third-party cybersecurity services to customers of cloud services is problematic because of performance and cost concerns. As a particular example, to perform an antimalware scan of customer data stored in an Amazon Elastic Block Store (EBS)™ storage volume, a cybersecurity service may have to take a snapshot of the customer data in the customer's account in the AWS™ cloud service, copy the snapshot to the cybersecurity service's account in the AWS™ cloud service, reform the snapshot back into a new EBS™ storage volume, and thereafter attach the new EBS™ storage volume to an Amazon Elastic Compute Cloud (EC2)™ instance for scanning. The just-mentioned scanning approach violates privacy laws because the cybersecurity service moves a complete copy of the customer data into its account and requires use of any encryption key outside of the customer's account. Furthermore, the scanning approach moves large amounts of data between accounts, thereby lengthening the scanning time and increasing the cost of the scanning.

BRIEF SUMMARY

In one embodiment, a cloud computing infrastructure hosts a web service with customer accounts. In a customer account, files of the customer account are listed in an index. Files indicated in the index are arranged in groups, with files in each group being scanned using scanning serverless functions in the customer account. The files in the customer account may include a compressed tar archive of a software container. Member files of a compressed tar archive in a customer account are randomly-accessed by way of locators that indicate a tar offset, a logical offset, and a decompressor state for a corresponding member file. A member file is accessed by seeking to the tar offset in the compressed tar archive, restoring a decompressor to the decompressor state, decompressing the compressed tar archive using the decompressor, and moving to the logical offset in the decompressed data in memory.

BRIEF DESCRIPTION OF THE DRAWINGS

A more complete understanding of the subject matter may be derived by referring to the detailed description and claims when considered in conjunction with the following figures, wherein like reference numbers refer to similar elements throughout the figures.

DETAILED DESCRIPTION

In the present disclosure, numerous specific details are provided, such as examples of systems, components, and methods, to provide a thorough understanding of embodiments of the invention. Persons of ordinary skill in the art will recognize, however, that the invention can be practiced without one or more of the specific details. In other instances, well-known details are not shown or described to avoid obscuring aspects of the invention.

Embodiments of the present invention are explained in the context of services available from the AWS™ cloud service. As can be appreciated, the embodiments are equally applicable to other cloud services.

Figure 1:
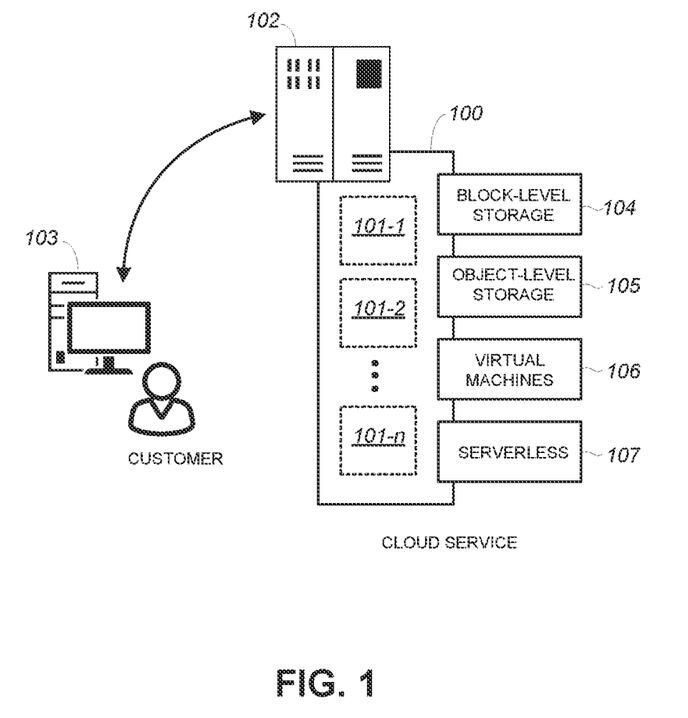
FIG. 1 shows a logical diagram of a system for scanning cloud resources of customers of a cloud service in accordance with an embodiment of the present invention.

FIG. 1 shows a logical diagram of a system for scanning cloud resources of customers of a cloud service in accordance with an embodiment of the present invention. The system of FIG. 1 includes a cloud service 100 and a computer 103 of a customer of the cloud service 100. In one embodiment, the cloud service 100 is the AWS™ cloud service. The cloud service 100 is hosted by a cloud computing infrastructure 102, which comprises one or more computers and associated software for providing the cloud service 100. The customer, using the computer 103, accesses the cloud service 100 over a computer network, which in this example is over the Internet.

The cloud service 100 has a plurality of accounts 101 (i.e., 101-1, 101-2, ..., 101-n), one for each customer. The cloud service 100 allows an account 101 to subscribe to one or more cloud service-provided resources, which in the example of FIG. 1 includes a block-level storage 104, an object-level storage 105, virtual machines 106, serverless platform 107, etc. In one embodiment, the block-level storage 104 is the Amazon EBS™ storage, the object-level storage 105 is the Amazon Simple Storage Service (S3)™ storage, the virtual machines 106 are Amazon EC2™ instances, and the serverless platform 107 is the AWS Lambda™ platform. The cloud service 100 provides an interface that allows the customer to log onto the account 101 and employ the cloud service-provided resources that the account 101 are subscribed.

An account 101 may be employed to maintain a server for ecommerce, run a business, stream content, or for other purpose that requires a computing infrastructure. The account 101 may have associated customer data stored in the block-level storage 104 or object-level storage 105, for example. Customer data includes files of an application program, software container ("container"), logs, or other data in the account 101. In one embodiment, as will be explained with reference to FIG. 2, one or more accounts 101 are subscribed to a third-party cybersecurity service that scans the customer data for cybersecurity threats or other purpose.

Figure 2:
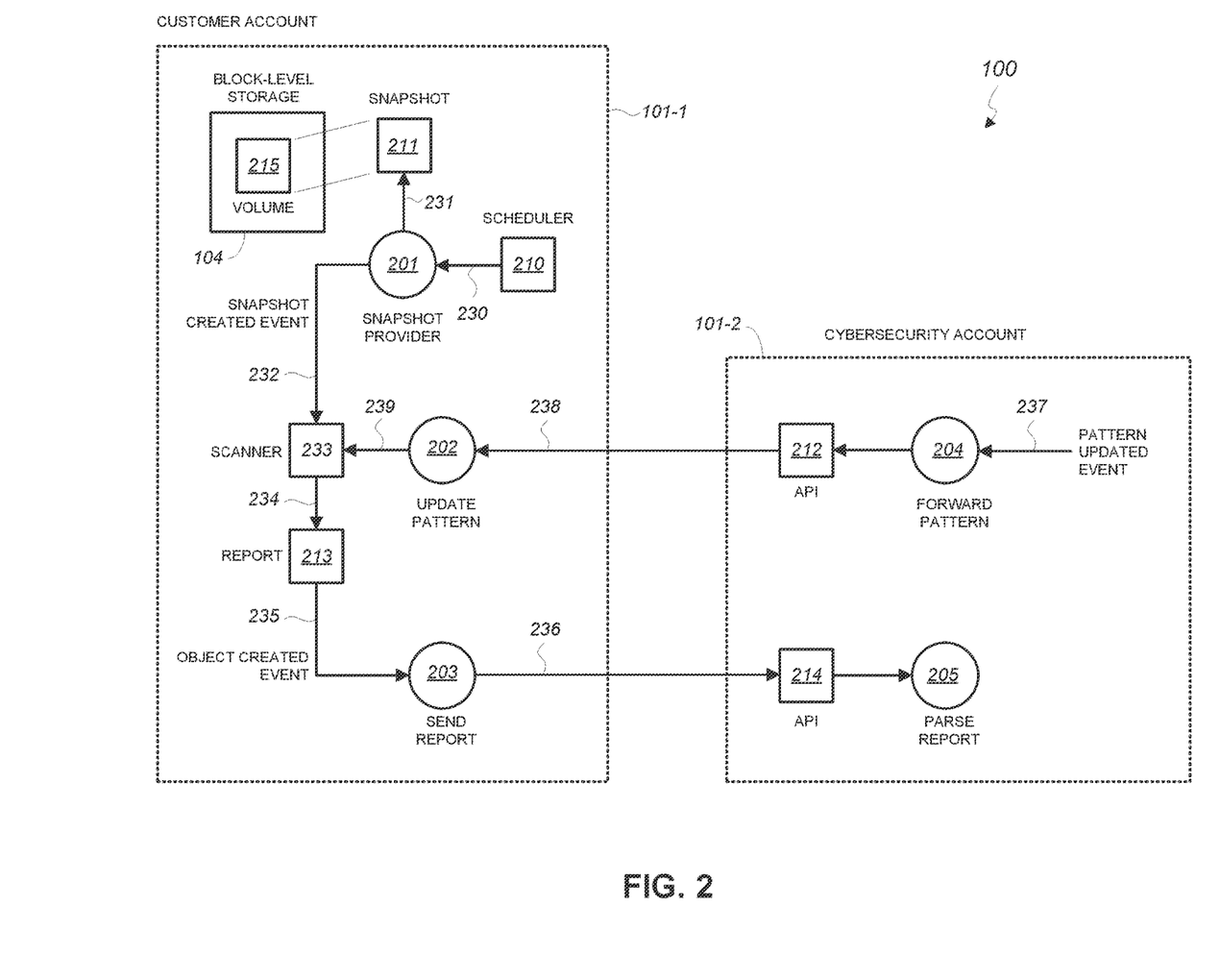
FIG. 2 shows a logical diagram of the configuration of the web service of FIG. 1 in accordance with an embodiment of the present invention.

FIG. 2 shows a logical diagram of the configuration of the web service 100 in accordance with an embodiment of the present invention. As previously noted, an account 101 may be configured to subscribe to a cybersecurity service to scan data of the account 101. In the example of FIG. 1, a customer account 101-1 is that of a customer, whereas a cybersecurity account 101-2 is that of a cybersecurity service. In one embodiment, the cybersecurity service protects file-based cloud resources, such as customer data that is stored as files in the block-level storage 104 and/or object-level storage 105 of the customer account 101-1. The cybersecurity service may scan customer data using serverless functions that are executed in the customer account, i.e., in the account 101-1 in the example of FIG. 1. The cybersecurity service may provide AWS CloudFormation™ templates to facilitate installation of the serverless functions in the customer account.

Generally, "serverless" is a cloud computing execution model in which the cloud service allocates machine resources on demand, to run application programs on behalf of its customers. A serverless function is a programmatic function for a particular purpose and executes in accordance with the serverless execution model. A serverless function is stateless and ephemeral. More particularly, a serverless function does not maintain data. The serverless function executes upon occurrence of a triggering event, and is destroyed after performing its function. A step function is a serverless orchestration service that lets a customer coordinate multiple serverless functions into one or more workflows. In one embodiment, the cybersecurity service is provided using serverless functions that are coordinated by a step function in the AWS Lambda™ platform.

In the example of FIG. 2, the snapshot provider function 201 is a serverless function that is configured to take a snapshot 211 of a volume 215 of the block-level storage 104. The block-level storage 104 stores data in storage blocks. Unlike the file-based storage 105, the block-level storage 104 cannot be directly accessed over the Internet.

The volume 215 is a group of storage blocks, which in this example store files of the customer. A snapshot 211 is a point-in-time copy of the volume 215. In one embodiment, the snapshot 211 is an Amazon EBS™ snapshot. A scheduler 210 triggers the snapshot provider function 201 to take the snapshot 211 of the volume 215. The scheduler 210 may trigger the snapshot provider function 201 (see arrow 230) to take the snapshot 211 (see arrow 231) in accordance with a predetermined schedule. In one embodiment, the scheduler 210 is implemented using the cron job feature of the AWS CloudWatch™ service.

The creation of the snapshot 211 generates an event (see arrow 232) that starts the scanner 233 to scan the snapshot 211. As will be further explained below, the scanner 233 comprises a step function and a plurality of serverless functions for scanning file-based cloud resources, such as files in the snapshot 211. The results of the scanning are provided by the scanner 233 as a report 213 (see arrow 234), which is stored as a file in the object-level storage 105. The writing of the report 213 in the object-level storage 105 triggers the send report function 203 (see arrow 235), which is a serverless function, to send the report 213 from the object-level storage 105 to the cybersecurity account 101-2 by way of an Application Programming Interface (API) 214 provided by the cloud service 100 for this purpose (see arrow 236).

In the cybersecurity account 101-2, the parse report function 205 is a serverless function that receives and parses the report 213 to detect anomalies. The parse report function 205 is configured to perform a response action, such as to raise an alert (e.g., send a message to an administrator; display an alert message on a screen), in response to finding an anomaly in the report 213. Such anomalies include presence of malware, exploitable vulnerabilities, invalid configurations, etc. detected in or from files in the volume 215.

The scanner 233 may employ a plurality of patterns to detect anomalies. More particularly, the scanner 233 may include a plurality of serverless functions that scan data against one or more patterns. For example, data that matches a malware pattern is detected to be infected by malware. The patterns may be updated from time to time. The updated patterns may be provided in an AWS Lambda™ layer that is published from the cybersecurity account 101-2. In the cybersecurity account 101-2, a forward pattern function 204 is a serverless function that is triggered by availability of the updated patterns (see arrow 237) in the cybersecurity account 101-2. Upon being triggered, the forward pattern function 204 triggers an update pattern function 202 in the customer account 101-1 (see arrow 238), by way of an API 212 provided by the cloud service for this purpose. The update pattern function 202 is a serverless function that when triggered updates the scanning serverless functions of the scanner 233 (see arrow 239) to use the updated patterns in the newly published AWS Lambda™ layer.

Figure 3:
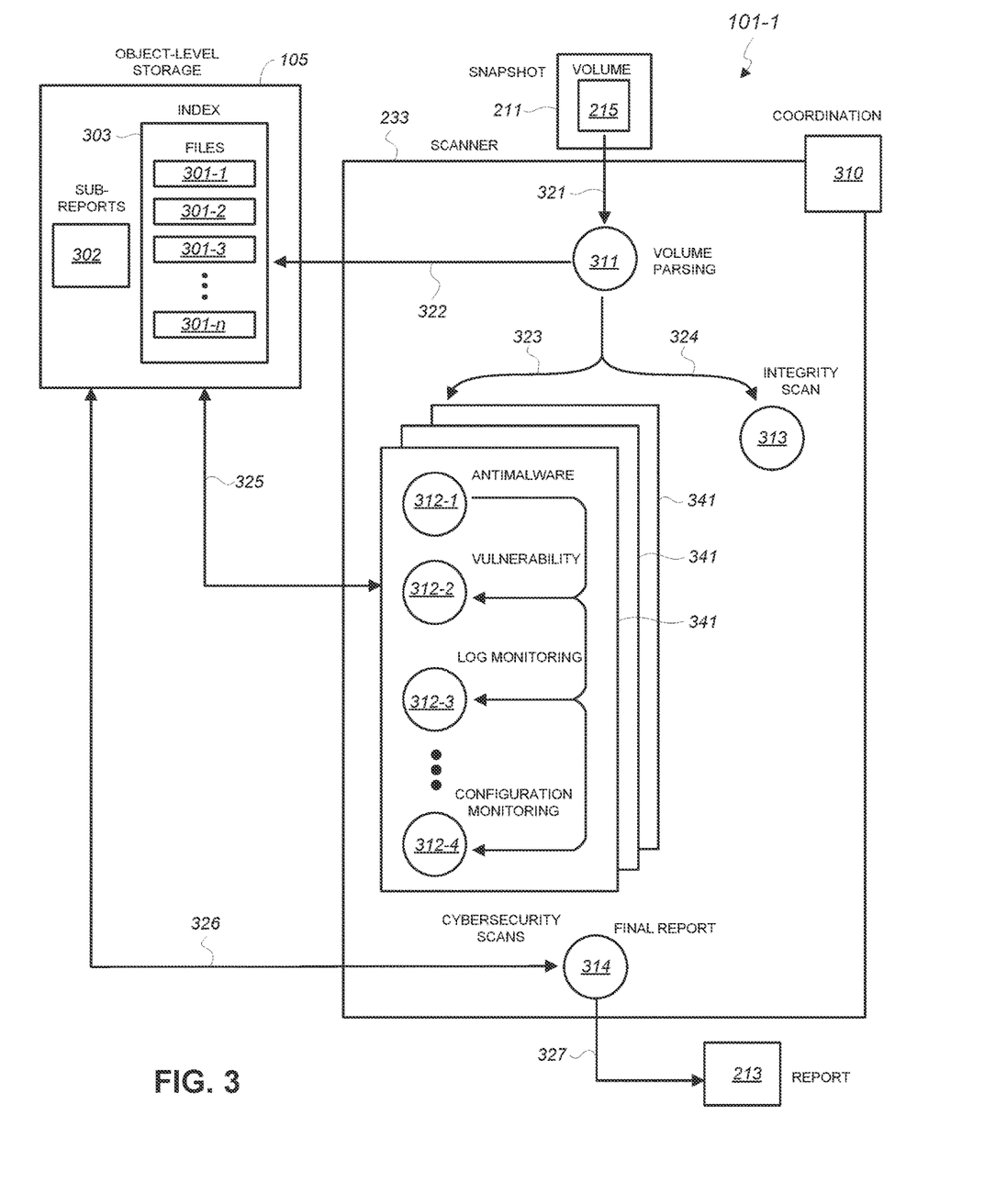
FIG. 3 shows a logical diagram of a scanner in accordance with an embodiment of the present invention.

FIG. 3 shows a logical diagram of the scanner 233 in accordance with an embodiment of the present invention. In one embodiment, the scanner 233 comprises a coordination step function 310, a volume parsing function 311, a plurality of cybersecurity scan functions 312 (i.e., 312-1, 312-2, 312-3, 312-4 . . . ), an integrity scan function 313, and a final report function 314 that all operate in the customer account 101-1. The coordination step function 310 is a step function, whereas the functions 311-314 are serverless functions.

The coordination step function 310 orchestrates the triggering of the functions 311-314. The coordination step function 310 initiates the scanning of the snapshot 211 in response to creation of the snapshot 211. The coordination step function 310 triggers the volume parsing function 311 to parse the volume 215 (see arrow 321), as reflected in the snapshot 211, to identify a plurality of files 301 (i.e., 301-1, 301-2, 301-3, . . . , 301-n) that are stored in the volume 215. The volume parsing function 311 identifies the files 301 in the volume 215 and generates an index 303 of the files 301. Because the volume parsing function 311 runs in the customer account 101-1, the volume parsing function 311 may be configured to use the customer's encryption keys that may be needed to decrypt the volume 215.

The index 303 is a listing that indicates the files 301 and the locations of the files 301 (e.g., starting sector, length, etc.) in the volume 215. The files 301 in the index 303 may be arranged in groups, with the groups of files 301 being scanned in parallel. The volume parsing function 311 writes the index 303 as a file in the object-level storage 105 of the customer account 101-1 (see arrow 322). As its name indicates, the object-level storage 105 stores data at the object level, which in this example is at the file level. Being a serverless function, the volume parsing function 311 is destroyed after parsing the volume 215 and writing the index 303 in the object-level storage 105.

After the volume 215 has been parsed by the volume parsing function 311, the coordination step function 310 triggers the scan functions 312 to scan the files 301 indicated in the index 303 (see arrow 323) and triggers the integrity scan function 313 to perform an integrity check of the volume 215 (see arrow 324).

In one embodiment, each file 301 is subjected to a scan chain 341, which scans the file 301 in sequence using the scan functions 312. In the example of FIG. 3, the scan function 312-1 scans a file 301 for malware, the scan function 312-2 scans the file 301 for vulnerability, the scan function 312-3 scans the file 301 for log monitoring, and the scan function 312-4 scans the file 301 for configuration monitoring. More particularly, for each file 301 assigned to a scan chain 341, the coordination step function triggers the scan function 312-1 to scan the file 301; after the scanning by the scan function 312-1, the coordination step function 310 triggers the scan function 312-2 to scan the file 301; after the scanning by the scan function 312-2, the coordination step function 310 triggers the scan function 312-3 to scan the file 301; and after the scanning by the scan function 312-3, the coordination step function 310 triggers the scan function 312-4 to scan the file 301. As can be appreciated, the number and type of scan functions in a scan chain 341 depend on the file and particular cybersecurity application. The scan functions 312 may scan the file 301 using conventional cybersecurity algorithms.

The number of files 301 assigned to each scan chain 341 depends on the number of files 301 in the index 303. For load balancing, the files 301 indicated in the index 303 may be divided as equally as possible among the available scan chains 341. For example, assuming ten files 301 in the index 303 and there are ten scan chains 341, each file 301 is assigned to a single scan chain 341. As another example, assuming 100 files 301 in the index 303 and there are ten scan chains 341, ten files 301 are assigned to each scan chain 341.

The coordination step function 310 may initiate scanning of the files 301 in groups, with each group of files 301 being assigned to a scan chain 341. For example, assuming each group has ten files 301, the coordination step function 310 may initiate ten scanning chains 341 to execute in parallel. Each of the ten files 301 that are grouped together in a scanning chain 341 is scanned in sequence.

The integrity scan function 313 scans the volume 215 for changes or differences in the volume 215 since the last scan, such as new files created, deleted, or modified. The integrity scan provides a system view that is useful in detecting a security threat. For example, files added or deleted when no file addition or deletion is expected indicates a possible security breach. Another example of a possible security breach is modification or deletion of special files, such as password files.

The scan functions 312 and the integrity scan function 313 generate sub-reports 302 indicating the result of their respective scans and write the sub-reports 302 in the object-level storage 105 of the customer account 101-1 (see arrow 325). Being serverless functions, the scan functions 312 and the integrity scan function 313 are destroyed after completing their scans and writing the corresponding sub-reports 302 in the object-level storage 105.

After completion of the cybersecurity and integrity scans, the coordination step function 310 triggers the final report function 314 to compile the sub-reports 302 (see arrow 326) from the object-level storage 105 to generate the report 213 (see arrow 327). As previously noted with reference to FIG. 2, the report 213 is subsequently provided to the cybersecurity account 101-2 for analysis (see FIG. 2, arrow 235).

Figure 4:
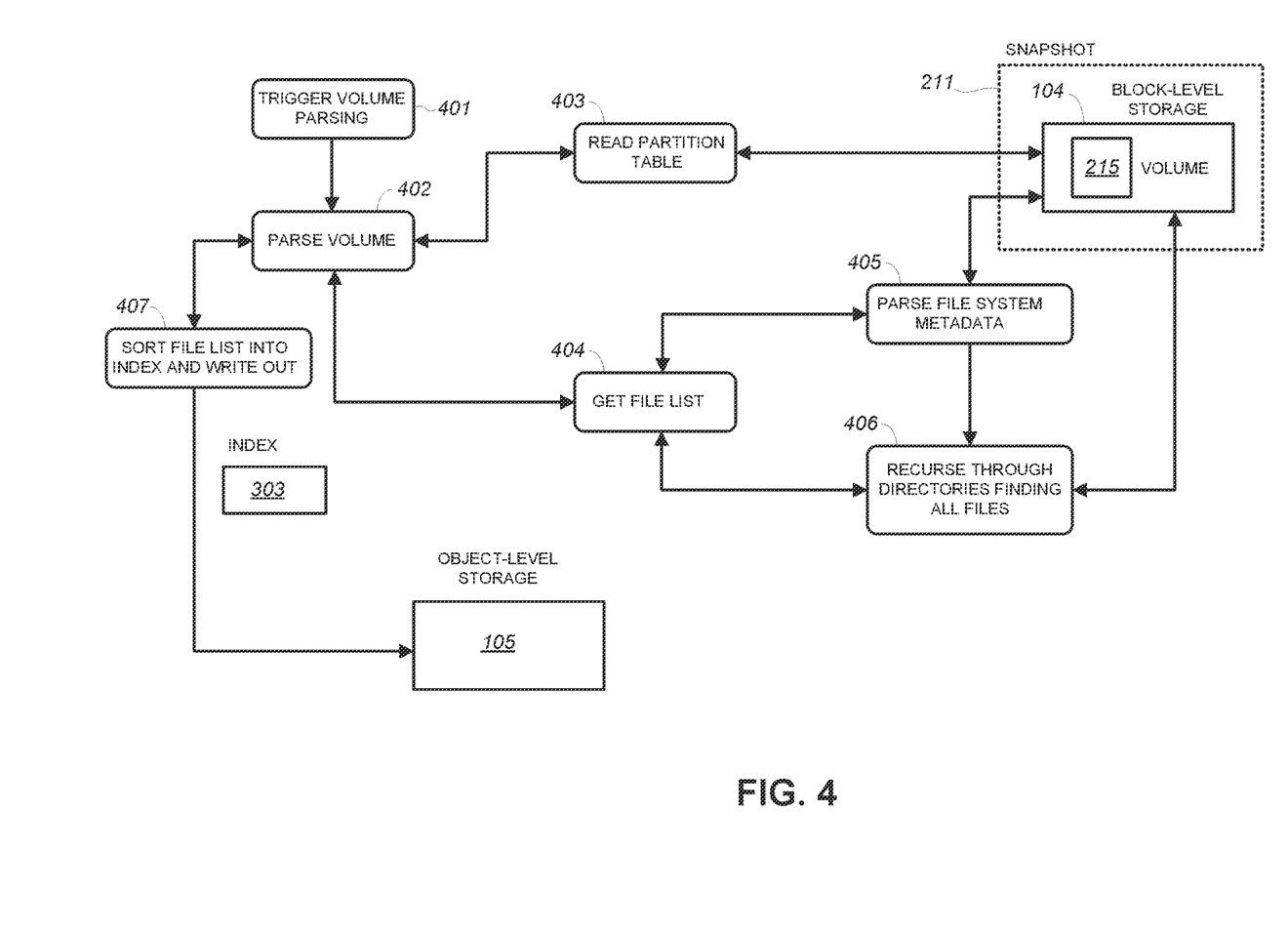
FIG. 4 shows a flow diagram of a method of parsing a volume of a block-level storage in accordance with an embodiment of the present invention.

FIG. 4 shows a flow diagram of a method of parsing the volume 215 of the block-level storage 104 in accordance with an embodiment of the present invention. The method of FIG. 4 may be performed by the volume parsing function 311 (shown in FIG. 3).

The method of FIG. 4 is initiated when the coordination step function 310 triggers the volume parsing function 311 to parse the volume 215 as represented in the snapshot 211 (step 401). The volume parsing function 311 initiates the parsing of the volume 215 (step 402) by reading the partition table of the block-level storage 104 from the snapshot 211 (step 403). The partition table provides block location information in the block-level storage 104, which allows the volume parsing function 311 to get a listing of the files stored in the volume 215 (step 404). More particularly, the volume parsing function 311 retrieves and parses the file system metadata of the block-level storage 104 (step 405) to identify and find files in all directories and sub-directories (step 406) in the volume 215. The volume parsing function 311 sorts the identified files into the index 303 and writes out the index 303 to the object-level storage 105 (step 407). The volume parsing function 311 is thereafter destroyed.

Figure 5:
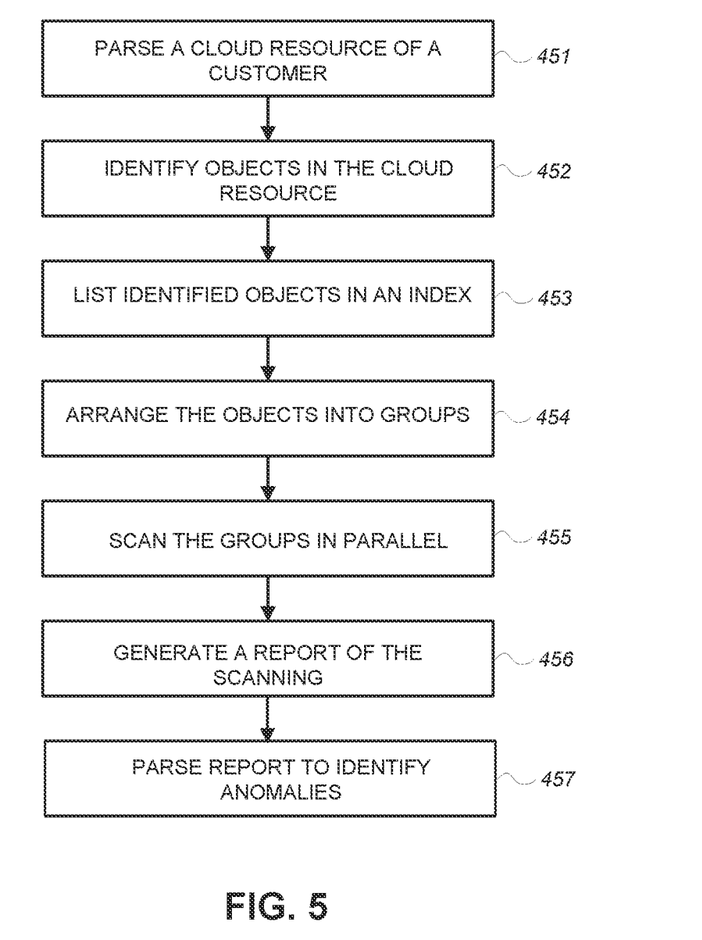
FIG. 5 shows a flow diagram of a method of scanning cloud resources of customers of a cloud service in accordance with an embodiment of the present invention.

FIG. 5 shows a flow diagram of a method of scanning cloud resources of customers of a cloud service in accordance with an embodiment of the present invention. The method of FIG. 5 is explained with reference to FIGS. 1-4. As can be appreciated, the method of FIG. 5 may also be performed using other components or steps without detracting from the merits of the present invention. In the example of FIG. 5, steps 451-456 are performed in a customer account (FIG. 2, customer account 101-1), whereas step 457 is performed in a cybersecurity account (FIG. 2, cybersecurity account 101-2).

In step 451, a cloud resource (e.g., volume 215 of the block-level storage 104) of a customer account (e.g., customer account 101-1) is parsed using a volume parsing serverless function (e.g., volume parsing function 311). In step 452, the parsing results in identification of objects (e.g., files 301) in the cloud resource. In step 453, the volume parsing serverless function lists the identified objects in an index (e.g., index 303). In step 454, the objects in the index are arranged in groups (scan chains 341). In step 455, the groups are scanned in parallel, with objects in a group being scanned by a sequence of scanning serverless functions (e.g., scan functions 312). In step 456, a final report serverless function (e.g., final report function 314) generates a report (e.g., report 213) that includes sub-reports of the results of the scanning. In step 457, the report is analyzed in the cybersecurity account (e.g., account 101-2) by a parse report serverless function (e.g., parse report function 205) to identify an anomaly, such as presence of malware in the objects.

The above-described embodiments scan customer data that are stored in block-level storage. As can be appreciated, the embodiments can also scan customer data that are stored in other types of storage, e.g., customer data stored as files in object-level storage. In that case, the volume parsing function would simply read the files from the object-level storage and sort the files into an index. The files in the index can then be scanned as explained.

Embodiments of the present invention are especially advantageous in cloud services because the embodiments allow efficient scanning of software containers ("containers"). More particularly, application programs of a customer account in a cloud service may be provided as containers. A container wraps an application program to include auxiliary program code, such as runtime, system tools, system libraries, etc., that the application program needs to run in a host machine. Unlike a virtual machine, a container does not have its own, separate operating system; the container shares the host operating system with other containers in the host machine. Containers are lightweight and relatively easy to deploy compared to virtual machines, hence the popularity of containers. In the cloud service 100, containers may be run in an instance of the virtual machines 106, for example.

A container image comprises one or more layers that pack an application program (or application programs) and an environment for running the application program, whereas a container is a running instance of a container image. The application program that is containerized in the image may provide a web server, software as a service (SaaS), or other service or function.

Tar is a software utility for collecting a plurality of files into one archive file for distribution or backup purposes. A container image may be stored as a plurality of tar archives, with each tar archive being a layer of the container image. A file in a tar archive is also referred to as a "member file." To save storage space, a tar archive may be compressed using a compressor; the compressed tar archive can be decompressed using an associated decompressor. The compression and decompression may be performed using a variety of algorithms. For example the GNU Zip (GZIP) algorithm may be employed as a compressor for compressing a tar archive and as a decompressor for decompressing the compressed tar archive. A container image may be distributed as a "tar.gz" file, which is a tar archive that has been compressed using the GZIP algorithm.

Open source code for implementing the GZIP algorithm is available on the Internet. One can use the open source code to write an application program that uses the GZIP algorithm as a compressor/decompressor, and have access to internal data of the GZIP algorithm, such as data structures of the states maintained by the GZIP algorithm for compression and decompression. It is to be noted that embodiments of the present invention are not limited to the use of the GZIP algorithm. Other suitable algorithms for compression/decompression may also be used without detracting from the merits of the present invention.

Figure 6:
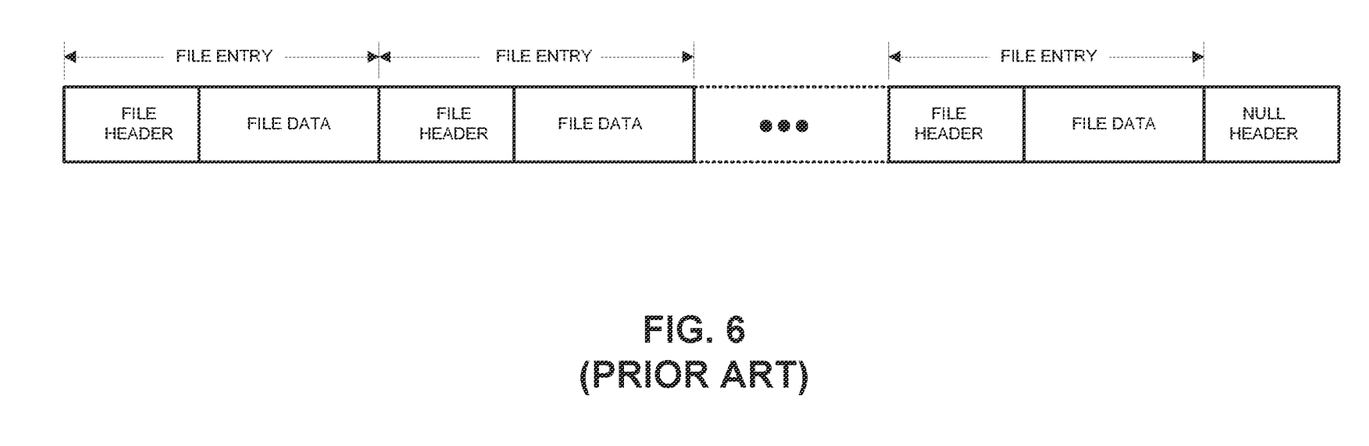
FIG. 6 (Prior Art) shows a logical diagram of a conventional tar archive.

FIG. 6 shows a logical diagram of a conventional tar archive. In a tar archive, each member file (i.e., a file archived in the tar archive) has a corresponding file entry, which consists of a file header followed by a corresponding file data. The file header describes the member file whose contents are in the immediately following file data. The file header has a standard format that is readily distinguishable from that of the file data, and indicates the length of the following file data. The file entries are written in sequence, one after another. That is, in a tar archive, a file header is immediately followed by its corresponding file data, which is immediately followed by another file header that is immediately followed by its corresponding file data, and so on. A null header at the end of the tar archive serves as an end of file indicator, i.e., indicates the end of the archive.

The distance between file headers varies with the size of the file data between them. In uncompressed tar archives, it is possible to read the first file header, skip the following file data, read the next file header, skip the next following file data, and so on until the file header of a target member file is found. The offset to the file entry of the target member file may be recorded to allow random access of the target member file by seeking directly to the offset without having to read the file entries of preceding member files. Under this approach, if the offset to each file entry is saved, any member file in the tar archive may be randomly accessed.

Compression of a tar archive is done in a streaming and continuous manner, beginning from the start of the tar archive towards the null header. The compressor starts in a known, standard startup state. The first data that the compressor compresses is a first file header, followed immediately by a first file data, followed immediately by a second file header, followed immediately by a second file data, and so on. The compression process makes it very difficult to determine the size of the compressed file data. As a result, it becomes very difficult to determine the distance from one file header to the next following file header in the compressed tar archive.

Decompression of a compressed tar archive is also performed in a streaming and continuous manner, beginning from the start of the compressed tar archive towards the null header. A compressed tar archive can be decompressed while reading through the compressed tar archive. The offset to each file entry in the compressed tar archive may be noted and saved during decompression. However, an offset to a target file entry in the compressed tar archive, by itself, is not enough to locate the target file entry in the decompressed data. This is because a small amount of compressed data could decompress to a large amount of data. A logical offset in the decompressed data is needed to locate and randomly access the file entry of the member file.

As a particular example, if a file is compressed from 1000 bytes to 100 bytes, the resulting compressed data written to disk is 100 bytes. When a first block of 10 bytes of the compressed data is decompressed, the first block of 10 bytes will expand in memory to somewhere around 100 bytes. Similarly, decompressing the following block of 10 bytes expands it in memory to around 100 bytes, which is appended to the prior 100 bytes. This decompression process continues until the full 1000 bytes of the file are re-assembled. In this particular example, an offset between blocks of data in the compressed data is 10 bytes. The logical offset is a pointer to a location in the corresponding 100 bytes in memory.

For any target file entry in a compressed tar archive, an offset to the target file entry in the compressed tar archive and a logical offset that identifies the target file entry in the corresponding decompressed data are not enough to return to the target file entry, in a random access manner, primarily because of how compressors/decompressors operate.

Generally, a compressor, such as that used by the GZIP algorithm, includes a sliding window of last seen data and an encoding table (e.g., Huffman encoding). The sliding window is moved through a file being compressed, in streaming fashion from the beginning of the file, and the last seen data of the file in the sliding window is encoded in accordance with the encoding table to compress the last seen data. The compressor keeps and updates a state as the compressor reads the file. The current state of the compressor is made of elements of what has been seen in the file up to the present point in the file. If this state is not saved, reconstruction of the file would require reading the file backwards (i.e., towards the start of the file), which becomes recursive until the start of the file is reached. The state of the compressor at the start of the file is a known constant set by the algorithm type (e.g., GZIP/BZIP2/etc.). In terms of complexity, to know the compressor state at byte N, byte N-1 needs to be read; to know the compressor state at byte N-1, byte N-2 needs to be read; and so on.

The decompressor works essentially the way as the compressor except the decompressor uses the encoding table in reverse, i.e., to decode compressed data back to its decompressed form. More particularly, the sliding window is moved through the compressed file, in streaming and continuous fashion from the beginning of the compressed file, with the last seen data of the compressed file in the sliding window being decompressed using the encoding table. The state of the decompressor at a particular point in the compressed file indicates portions of the compressed file that has already been decompressed up to that particular point. The state of the decompressor at that particular point, in conjunction with an offset to that particular point and a logical offset to the corresponding decompressed data, may be used to seek to a target file entry (and thus target member file) in the compressed file.

Figure 7:
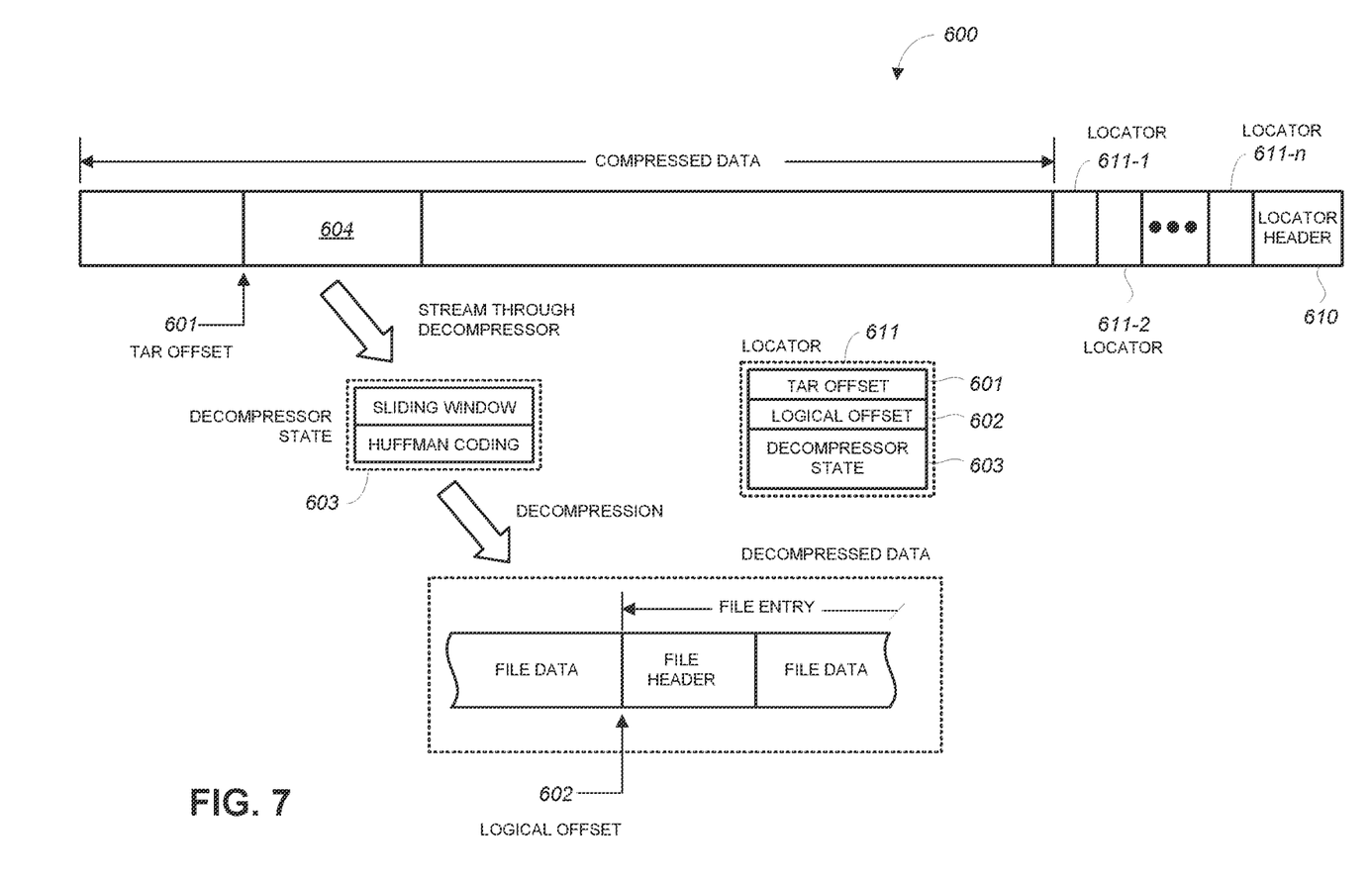
FIG. 7 shows a logical diagram that illustrates random access of a member file in a compressed tar archive in accordance with an embodiment of the present invention.

FIG. 7 shows a logical diagram that illustrates random access of a member file in a compressed tar archive in accordance with an embodiment of the present invention. By random access, it is meant that a target member file is accessed without having to decompress preceding member files in the compressed tar archive.

In the example of FIG. 7, a compressed tar archive 600 includes compressed data followed by a plurality of locators 611 (i.e., 611-1, 611-2, . . . , 611-*n*) and a locator header 610. The compressed data contains compressed file entries of member files. The locators 611 and the locator header 610 are appended to the end of the compressed data, so that they will not be processed by a program that is unaware of their format. In one embodiment, the locators 611 and the locator header 610 are not compressed.

Each file entry in the compressed tar archive 600 has a corresponding locator 611. The locator header 610 lists the locators 611 and indicates the file entries that correspond to the locators 611. This allows an application program, hereinafter "random access program", to randomly access a member file in the compressed tar archive 600 by reading the locator header 610 to identify the locator 611 that corresponds to the file entry of the member file, and seek directly to the file entry using information from the locator 611.

In one embodiment, a locator 611 includes a tar offset 601, a logical offset 602, and a decompressor state 603. For any file entry in the compressed tar archive 600, the tar offset 601 indicates a location in the compressed tar archive from which decompression is initiated to access the file entry. That is, the target file entry is downstream (i.e., going towards the end of the compressed tar archive 600) of the tar offset 601, at some point in the portion 604 of the compressed data.

The logical offset 602 is the location (e.g., start) of the target file entry in the decompressed data resulting from the decompression of compressed data that begins at the tar offset 601. More particularly, in the example of FIG. 7, the sliding window of the decompressor contains the portion 604, which is decoded using the Huffman coding to yield the decompressed data in memory. The logical offset 602 points to the beginning of the target file entry in the decompressed data that result from decompression of the portion 604 immediately following the tar offset 601.

The decompressor state 603 is the state of the decompressor at the tar offset 601. In other words, the decompressor state 603 is the state of the decompressor at a point just prior to decompressing compressed data that is downstream of the tar offset 601, which in the example of FIG. 7 is just prior to the portion 604 of the compressed data. The decompressor state 603 includes information on portions of the compressed data that have already been through the sliding window and decompressed using the Huffman encoding table that was used in the compression.

To seek (i.e., move without reading preceding data) directly to the target file entry, the random access program identifies the locator 611 of the target file entry from the locator header 610. The random access program then seeks directly to the tar offset 601 indicated in the locator 611. The random access program thereafter restores the decompressor to the decompressor state 603 indicated in the locator 611. The decompressor then decompresses, from the tar offset 601, the compressed data downstream of the tar offset 601 (i.e., the portion 604), resulting in corresponding decompressed data in main memory. The random access program then accesses the target file entry at the logical offset 602 (indicated in the locator 611) in the decompressed data in the main memory.

The locators 611 and the locator header 610 may be generated during compression of a tar archive or decompression of the compressed tar archive. This is because the compressor and decompressor states are the same data structures; data is added to the data structures during compression, and data is read out of the data structures during decompression. That is, the compressor state and the decompressor state are the same at the tar offset 601. More particularly, in the case of GZIP, the Huffman table is built during compression, so the data goes from the original file into the Huffman table. During decompression, data is read out from the Huffman table. The Huffman table for compression and decompression need to be the same to end up with the same file.

The tar offset, compressor state at the tar offset, and logical offset in the uncompressed (decompressed) data may be noted for each member file during compression of a tar archive. Similarly, the tar offset, decompressor state at the tar offset, and logical offset in the decompressed data may be noted for each member file during decompression of a compressed tar archive. The tar offset, compressor/decompressor state, and logical offset of each member file may be indicated in a locator, with the locators of the member files being indicated in a locator header. The locators and the locator header may then be appended to the compressed tar archive. This process may be performed for all tar archives and compressed tar archives in a customer account of a cloud service.

Figure 8:
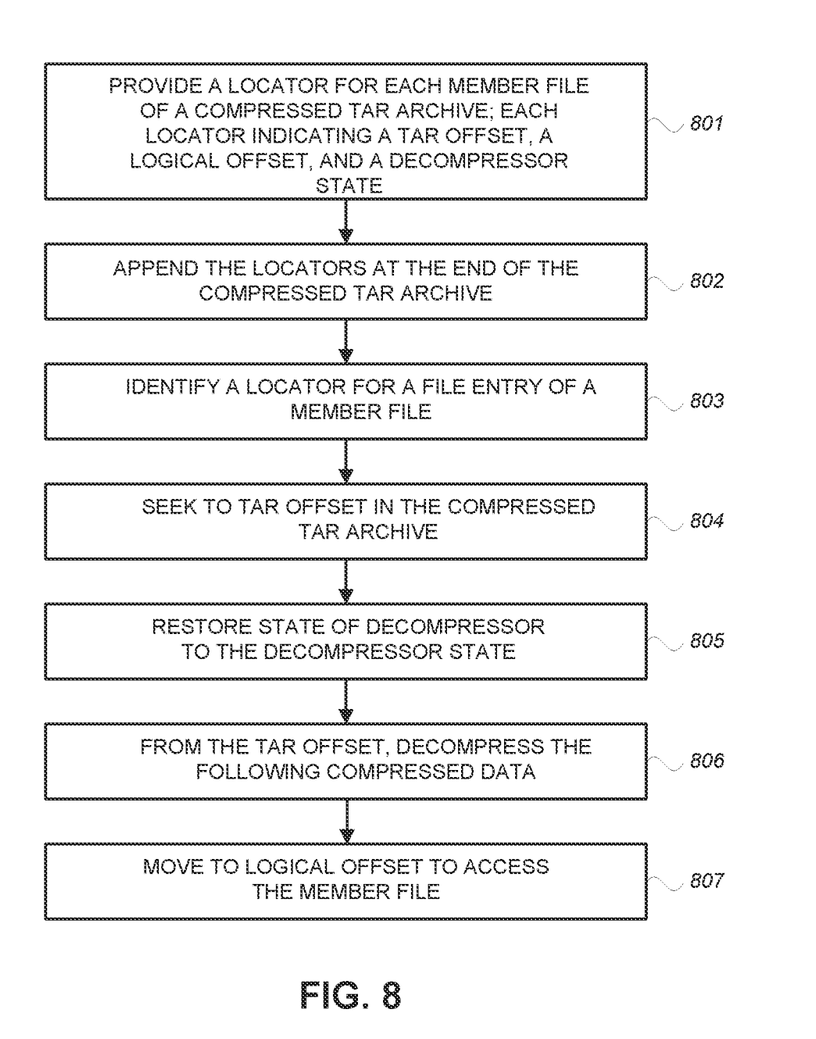
FIG. 8 shows a flow a diagram of a method of random access of a target member file in a compressed tar archive in accordance with an embodiment of the present invention.

FIG. 8 shows a flow a diagram of a method of random access of a member file in a compressed tar archive in accordance with an embodiment of the present invention. The method of FIG. 8 is explained with reference to FIG. 7. As can be appreciated, the method of FIG. 8 may also be performed using other components or steps without detracting from the merits of the present invention.

In step 801, a locator (e.g., locator 611) is provided for each member file of a compressed tar archive (e.g., compressed tar archive 600). Each locator indicates a tar offset in the compressed tar archive, a logical offset to a file entry of the member file in the corresponding decompressed data, and a decompressor state at the tar offset. In step 802, the locators are appended at the end of the compressed tar archive.

In step 803, to randomly access a member file in the compressed tar archive, a random access program identifies the locator for the file entry of the member file. In one embodiment, a locator header that identifies the locators of the member files are appended at the end of the locators in the compressed tar archive.

In step 804, the random access program seeks directly to the tar offset in the compressed tar archive. In step 805, the random access program restores the state of the decompressor to the decompressor state indicated in the locator. In step 806, with the decompressor at the decompressor state, the random access program uses the decompressor to decompress the compressed data following the tar offset. Decompressing the compressed data results in corresponding decompressed data in memory. In step 807, the random access program moves to the logical offset in the decompressed data in memory. From the logical offset, the random access program accesses the file entry of the member file.

Random access of compressed tar archives as described in the embodiments is especially advantageous with regards to container images. The embodiments allow random access of layers of a container image that is in compressed tar format. More particularly, the embodiments allow individual layers of the container image to be randomly accessed so that the layers can be scanned in parallel. Without the embodiments, the layers of the container image will have to be accessed conventionally in streaming fashion, and will have to be scanned serially one after another.

While specific embodiments of the present invention have been provided, it is to be understood that these embodiments are for illustration purposes and not limiting. Many additional embodiments will be apparent to persons of ordinary skill in the art reading this disclosure.

What is claimed is:

1. A method of scanning a plurality of files of a customer account of a cloud service for cybersecurity, the method to be performed in the customer account, the method comprising:

creating a snapshot of a storage volume of a block-level storage of the customer account, wherein the snapshot is a point-in-time copy of the storage volume and the block-level storage is provided as a service by the cloud service;

parsing the snapshot to identify the plurality of files in the storage volume;

indicating the plurality of files in an index;

storing the index in an object-level storage of the customer account, the object-level storage being provided as a service by the cloud service;

triggering a plurality of scanning serverless functions to scan the plurality of files indicated in the index as stored in the object-level storage for cybersecurity, each of the scanning serverless functions being stateless and ephemeral; and each of the scanning serverless functions generating a sub-report of a result of a corresponding scanning and storing the sub-report in the object-level storage.

2. The method of claim 1, further comprising:

triggering a reporting serverless function to compile the sub-reports in the object-level storage into a final report, the reporting serverless function being stateless and ephemeral.

3. The method of claim 2, further comprising: forwarding the final report to a cybersecurity account of a third-party cybersecurity service in the cloud service.

4. The method of claim 1, further comprising:

organizing the plurality of files indicated in the index into a plurality of groups; and for each file assigned to a group of the plurality of groups, scanning the file in sequence using a first set of scanning serverless functions of the plurality of scanning serverless functions.

5. The method of claim 1, wherein the snapshot is created by a snapshot provider serverless function, the snapshot provider serverless function being stateless and ephemeral.

6. The method of claim 5, wherein the snapshot provider serverless function is triggered in accordance with a predetermined schedule.

* * * * *